N. RAYMER.
FRUIT JAR.
No. 84,214.      Patented Nov. 17, 1868.
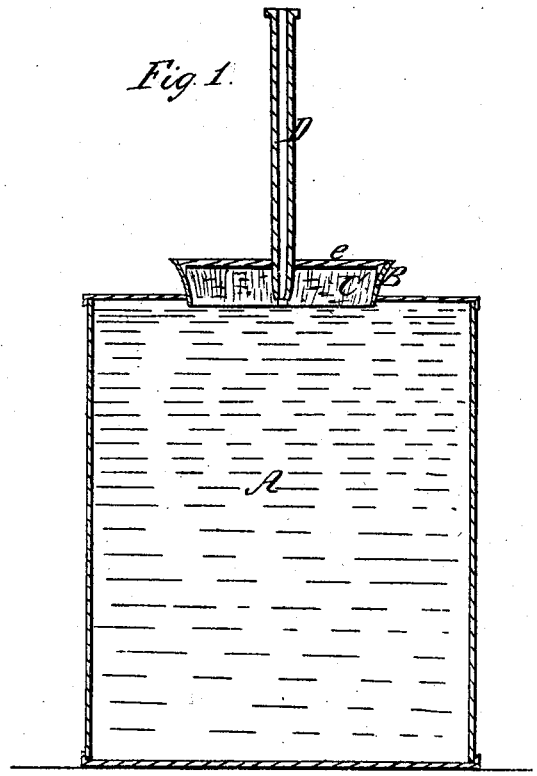
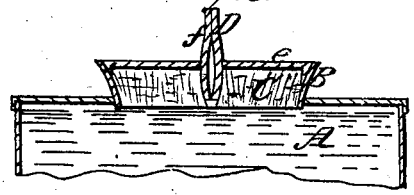
Witnesses:
Wm A. Morgan
G. C. Cotton
Inventor;
Nat Raymer
per Munn
Attorneys

United States Patent Office.

NAT. RAYMER, OF NEW STERLING, NORTH CAROLINA.

Letters Patent No. 84,214, dated November 17, 1868.

IMPROVED FRUIT-JAR.

The Schedule referred to in these Letters Patent and making part of the same.

*To all whom it may concern:*

Be it known that I, NAT. RAYMER, of New Sterling, in the county of Iredell, and State of North Carolina, have invented a new and useful Improvement in Preserve Jars; and I do hereby declare that the following is a full, clear, and exact description thereof, which will enable those skilled in the art to make and use the same, reference being had to the accompanying drawings, forming part of this specification.

This invention consists in a stopper or cork for fruit-jars, provided with a short metallic tube, which affords a ready means for extracting the air from the jar without the aid of steam or an air-pump, and, also, of hermetically sealing the same, thereby adapting the jar to ordinary use in families where facilities for putting up fruit on a large scale are not enjoyed.

In the drawing—

Figure 1 represents a vertical section of a jar, constructed according to my invention, and prepared for extracting the air therefrom.

Figure 2 is a sectional elevation of the same, showing the jar as when sealed according to my process.

Similar letters of reference indicate corresponding parts.

A is the jar, which is made of tin or of any other suitable material.

It has a flaring mouth or orifice, B, in its upper end, to which is fitted a tapering stopper, C, provided with a short tube, D, of lead or other fusible metal.

The operation is as follows:

When the jar is filled with fruit or other article to be preserved, the stopper C, having the short metal tube D inserted in it, is introduced into the mouth of the jar, and covered by sealing-wax or other sealing-material, E.

The air in the jar is then to be exhausted by applying the mouth to the end of the tube and sucking out the air.

When the jar is exhausted of air, the end of the tube is closed by the tongue so as to prevent the entrance of air, and the tube is pinched or flattened with a pair of pliers, or in some other manner, as seen at *f*, fig. 2, so that all entrance of air is precluded.

The tube is then cut off just above the pliers or flattened place, as seen, before the pliers are removed, when the end thus cut is fused with a hot iron, or soldered over, and the work is done.

This operation is readily performed in families, or wherever it may be desirable to put up or preserve fruit for sale or use.

I claim as new, and desire to secure by Letters Patent—

As an article of manufacture, a stopper or cork for fruit-jars, made as described, viz, furnished with a short metallic tube, through which the air may be readily drawn, and by the pressing together of which the jar is hermetically sealed.

NAT. RAYMER.

Witnesses:
WILL. P. DRAKE,
C. A. CARLTON.